D. W. HUGHES.
Hand-Seeder.
No. 13,820.
Patented Nov. 20, 1855.
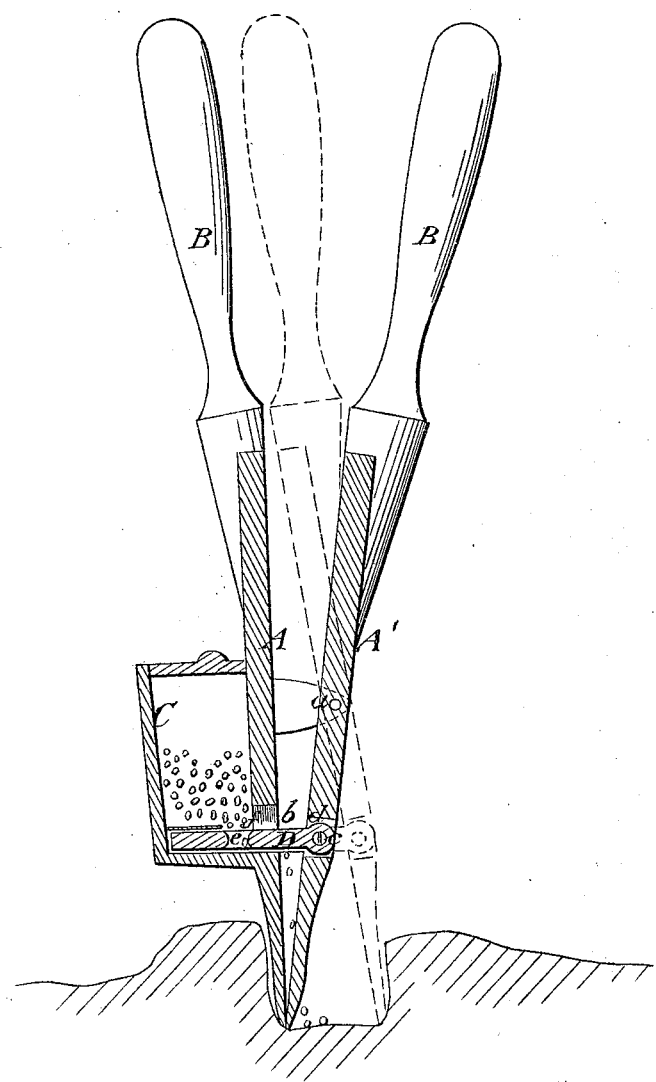

UNITED STATES PATENT OFFICE.

D. W. HUGHES, OF NEW LONDON, MISSOURI.

IMPROVEMENT IN HAND SEED-PLANTERS.

Specification forming part of Letters Patent No. 13,820, dated November 20, 1855.

*To all whom it may concern:*

Be it known that I, D. W. HUGHES, of New London, in the county of Ralls and State of Misscuri, have invented a new and Improved Implement or Device for Planting Corn and Other Seed by Hand; and I do hereby declare that the following is a full, clear, and exact description of the same, reference being had to the annexed drawing, making a part of this specification, said drawing being a vertical section of my improvement.

The nature of my invention consists in having two blades connected by a joint or pivot, so that the ends of the blades may be opened and closed or be brought in contact and forced out from each other, and having a seed-box attached to one blade and a perforated slide to the other, which slide works in the lower part of the seed-box, the above parts being so arranged, as will be presently shown and described, so that by placing the ends of the blades in the ground and forcing them apart the necessary hole will be made and the corn or other seed deposited in said hole.

To enable those skilled in the art to fully understand and construct my invention, I will proceed to describe it.

A A' represent two blades, which may be constructed of flat strips or bars of wood, connected by a joint or pivot, *a*, a suitable distance from their lower ends. The blades are made of suitable width and length, and the lower ends should be shod with metal to insure durability.

B B represent two handles, which are attached to the upper ends of the blades A A.

To the outer side of one of the blades A there is attached a seed-box, C, and to the opposite blade, A', there is attached a slide, D, which passes through a mortise, *b*, in the blade A and into the bottom or lower part of the seed-box C. The outer end of the slide D is attached by a pivot, *c*, in a mortise, *d*, in the blade A'. The slide D has a hole, *e*, made through it, and a brush, *f*, is placed in the mortise *b*, the end of the brush bearing upon the slide D.

Operation: The corn or other seed to be planted is placed in the seed-box C, and the operator grasps the handles B B and forces them apart, and the lower ends of the blades A A' are consequently brought together. The lower ends of the blades are then shoved into the ground at the proper place and the handles B B brought together, and the lower ends of the blades A A' will be consequently forced apart, and the slide D will be drawn out from the seed-box C, and the seed which fills the hole *e* will fall into the hole made by distending or separating the lower ends of the blades. (See red lines.) The lower ends of the blades are then brought together and withdrawn from the hole, which is filled and the seed covered by the loose earth, which will naturally fall into the hole when the blades are withdrawn from it.

By the within-described invention a simple, cheap, and efficient hand seed-planter is obtained, and one that may be used on rough ground equally as well as on smooth.

The implement is designed chiefly for planting corn, although it may be advantageously employed for planting many kinds of seeds.

I do not claim separately or in itself considered the perforated slide D, working in a seed-box for distributing seed, for that is an old and well-known device; but

What I claim as new, and desire to secure by Letters Patent, is—

The seed-box C and perforated slide D, when attached to blades A A', connected by a joint, *a*, arranged substantially as shown, for the purpose specified.

D. W. HUGHES.

Witnesses:
WILLIAM P. CARSTARPHEN,
G. M. KIGHTLEY.